United States Patent [19]
Davis

[11] 3,746,383
[45] July 17, 1973

[54] AUXILIARY BUMPER IMPACT PROTECTOR

[75] Inventor: Thomas L. Davis, Clawson, Mich.

[73] Assignee: The Raymond Lee Organization, Inc., New York, N.Y. (part interest)

[22] Filed: Aug. 3, 1971

[21] Appl. No.: 168,705

[52] U.S. Cl. .............................. 293/71 R, 293/87
[51] Int. Cl. ..... B60j 11/00, B60r 19/02, B61f 19/04
[58] Field of Search .......................... 293/71 R, 87

[56] References Cited
UNITED STATES PATENTS

| 1,453,521 | 5/1923 | Riedele | 293/87 |
| 1,586,988 | 6/1926 | Griffin | 293/87 |
| 1,716,345 | 6/1929 | Nordgren | 293/87 |
| 2,062,315 | 12/1936 | Jandus et al. | 293/71 R |

Primary Examiner—Gerald M. Forlenza
Assistant Examiner—Howard Beltran
Attorney—Howard I. Podell

[57] ABSTRACT

An energy absorbtion mechanism consisting of U-shaped structural members fastened to the automobile frame, and to the automobile bumpers and the bumper guards, which acts to absorb front or rear impact forces to prevent or minimize damage to an automobile and its occupants.

1 Claim, 4 Drawing Figures

PATENTED JUL 17 1973          3,746,383

INVENTOR
THOMAS L. DAVIS
By *Howard I. Poley*
         Agent.

AUXILIARY BUMPER IMPACT PROTECTOR

SUMMARY OF THE INVENTION

The purpose of my invention is to prevent damage to an equipped automobile from minor collisions and to minimize automobile damage and injury to occupants in the case of front or rear end collisions.

My invention consists of U-shaped structural members, which connect a horizontal external protector member to the automobile frame, said U-shaped members absorbing the forces created by the impact of front or rear collisions, while protecting the automobile body from damage.

BRIEF DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 1:
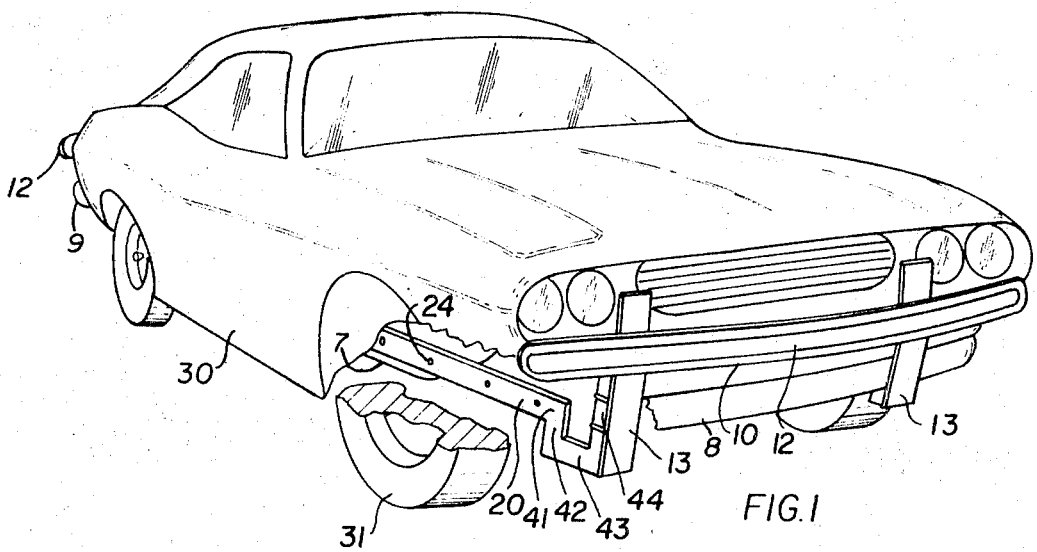
FIG. 1 is a perspective view with a cutaway section of my invention mounted on an automobile.
Figure 2:
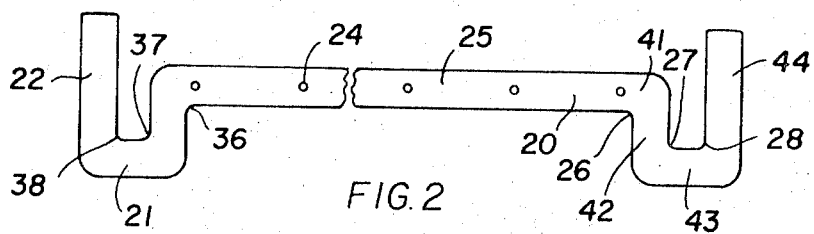
FIG. 2 is a side view of a longitudinal structural member which fastens to the automobile frame and with the front and rear energy absorbing U-shaped sections.

Turning now descriptively to the drawings, in which similar reference characters denote similar elements throughout the several views, FIG. 1 indicates the mechanism 20 as installed on an automobile 30 having a front bumper 8 and a rear bumper 9. In the preferred embodiment a longitudinal structural member 25 parallels the automobile frame 7 on each side from front to rear, with attachment holes 24 for fastening to the sides of the automobile frame 7.

At the forward section of the longitudinal member 25, forward of the axle of front wheel 31, the structure bends at angle 26 to a vertical position 42, then bends at angle 27 to a horizontal position 43, then bends at angle 28 to a vertical position 44 forming an impact absorbing U-shaped section. Front vertical guard member 13 is fastened to section 44, preferably by weldment, and front horizontal protector member 10 is similarly fastened to both front guard members 13. In the preferred embodiment, a strip of rubber 12 is anchored in the front horizontal protector member 10.

Similarly at the rear section of the longitudinal member 25, and to the rear of the rear axle, the structure bends to a vertical position at angle 36, to the horizontal position at angle 37 and to the vertical position at angle 38 terminating in a vertical position 22 to form an impact absorbing U-shaped section to which rear vertical guard 13 is fastened. Rear horizontal protector 10 is fastened to the rear vertical guards 13.

Longitudinal member 25 may be incorporated as an integral section of the automobile frame, or it may be bolted or welded to the side of the conventional frame.

Figure 3:
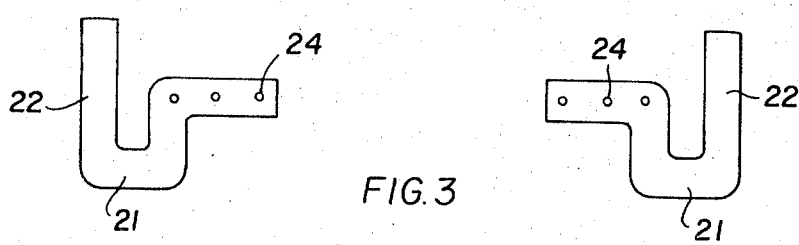
FIG. 3 is a side view of the front and rear energy absorbing U-shaped sections, adaptable to being fastened to an automobile frame.
Figure 4:
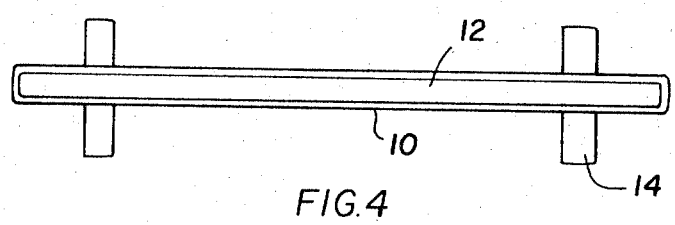
FIG. 4 is a front view of the automobile illustrating the horizontal protector member and the vertical guards which fasten to the energy absorbing members.

FIG. 3 illustrates energy absorbing U-shape frames which may be bolted through holes 24 to the sides and ends of conventional automobile frames.

While the dimensions of the longitudinal member 25 may vary with the size of automobile, the preferred embodiment utilizes a steel member one-half inch wide and 3 inches high. Horizontal automobile protector 10 and vertical guard 13 are fabricated from the same size steel, but finished if desired in chromium plating for decorative purposes.

It is to be noted, that the installation of the energy absorbing U-shaped members, vertical guards and horizontal protector may be accomplished in existing automobiles without requiring removal of existing front or rear bumper members, since the U-shaped members fit around the existing automobile bumpers.

It is anticipated that automobiles equipped in accordance with the teachings of this invention will so reduce the expensive costs associated with minor but frequent automobile mishaps as to warrant reduced insurance premiums.

Since obvious changes may be made in the specific embodiment of the invention described herein without departing from the scope thereof, it is indicated that all matter contained herein is intended to be interpreted in an illustrative and not in a limiting sense.

Having thus described my invention, what I claim as new, and desire to secure by Letters Patent of the United States is:

1. An energy absorbing mechanism to prevent or minimize damage to the automobile and to its occupants, occasioned by front-end or rear-end collisions which is mounted about the conventional front and rear bumpers of an automobile, comprising a pair of steel members, each of which terminates at each end in a U-shaped section, said U-shaped section being of a size to fit under and about a conventional automobile bumper, with both steel members fastened to the opposing sides of the frame of the automobile so that the ends of said U-shaped sections terminate beyond the conventional front and rear automobile bumpers with a horizontal protector member being fastened at the rear of the automobile to the right and left rear ends of the rear U-shaped section and a second protector horizontal member fastened at the front of the automobile to the right and left front ends of the front U-shaped section so that in the installed condition, the U-shaped sections run underneath the conventional automobile bumpers, with the vertical guard members and the horizontal protector members being external to both the conventional automobile front and rear bumpers.

* * * * *